US009388772B2

(12) United States Patent
Fick et al.

(10) Patent No.: US 9,388,772 B2
(45) Date of Patent: Jul. 12, 2016

(54) NEEDLE SLEEVE FOR PIVOTABLY MOUNTING THE THROTTLE VALVE SHAFT OF A CONTROL DEVICE FOR RECIRCULATING EXHAUST GAS IN INTERNAL COMBUSTION ENGINES

(75) Inventors: Matthias Fick, Schnaittach (DE); Heinz Schäfers, Erlangen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 353 days.

(21) Appl. No.: 14/003,197

(22) PCT Filed: Dec. 2, 2011

(86) PCT No.: PCT/EP2011/071647
§ 371 (c)(1),
(2), (4) Date: Sep. 4, 2013

(87) PCT Pub. No.: WO2012/119671
PCT Pub. Date: Sep. 13, 2012

(65) Prior Publication Data
US 2013/0340729 A1 Dec. 26, 2013

(30) Foreign Application Priority Data
Mar. 10, 2011 (DE) .......................... 10 2011 005 341

(51) Int. Cl.
*F02M 25/07* (2006.01)
*F02D 9/10* (2006.01)
(Continued)

(52) U.S. Cl.
CPC ............. *F02M 25/077* (2013.01); *F02D 9/106* (2013.01); *F16C 19/466* (2013.01);
(Continued)

(58) Field of Classification Search
CPC . F02M 25/07; F02M 25/077; F02M 25/0793; F16C 19/44; F16C 19/19466; F16C 33/28; F16C 33/605; F16C 33/7809; F16K 1/224; F16K 1/2268; F16K 1/226; Y02T 10/121
See application file for complete search history.

(56) References Cited

U.S. PATENT DOCUMENTS

| 3,306,682 A | 2/1967 | Cowles ...................... 308/187.2 |
| 3,384,429 A | 5/1968 | Farrell ....................... 308/187.1 |
| 4,924,840 A * | 5/1990 | Wade ...................... F02D 21/08 123/568.19 |
| 5,419,641 A | 5/1995 | Fujinami et al. .............. 384/470 |

(Continued)

FOREIGN PATENT DOCUMENTS

| DE | 1667026 U | 11/1953 |
| DE | 1450051 A1 | 11/1969 |
| DE | 10 2006 053 716 A1 | 5/2008 |

(Continued)

*Primary Examiner* — Hieu T Vo
(74) *Attorney, Agent, or Firm* — Fitzpatrick, Cella, Harper & Scinto

(57) ABSTRACT

A needle sleeve, in particular for pivotably mounting the throttle valve shaft of a control device for recirculating exhaust gas in internal combustion engines. The needle sleeve provides a thin-walled outer ring formed without cutting. A needle roller and cage assembly is inserted in the outer ring. The needle cage carries the bearing needles at uniform spacings in the circumferential direction. The needle sleeve has, at its axial sides, two radially inward facing ribs holding the needle roller and cage assembly in the outer ring and has multiple seals that seal the sleeve to prevent exhaust gas condensates from flowing through. The outer ring of the needle sleeve is a rimless, cylindrical sleeve, and the seals are two lip sealing rings having an S-shaped cross-sectional profile. The seals are located at least partially outside the outer ring and are pressed onto its axial edges, and provide the radially inward facing ribs.

9 Claims, 3 Drawing Sheets

(51) Int. Cl.
*F16C 19/46* (2006.01)
*F16C 33/60* (2006.01)
*F16C 33/78* (2006.01)
*F16K 1/22* (2006.01)
*F16K 1/226* (2006.01)

(52) U.S. Cl.
CPC .......... *F16C 33/605* (2013.01); *F16C 33/7809* (2013.01); *F16K 1/224* (2013.01); *F16K 1/2268* (2013.01); *Y02T 10/121* (2013.01)

(56) References Cited

U.S. PATENT DOCUMENTS

| | | | |
|---|---|---|---|
| 7,866,298 B2 | 1/2011 | Shimura et al. | 123/337 |
| 2009/0317031 A1 | 12/2009 | Pfundt et al. | 384/569 |

FOREIGN PATENT DOCUMENTS

| | | |
|---|---|---|
| EP | 0 410 871 A1 | 1/1991 |
| EP | 1 947 312 A1 | 7/2008 |
| WO | 2009/103378 A1 | 8/2009 |

* cited by examiner

NEEDLE SLEEVE FOR PIVOTABLY MOUNTING THE THROTTLE VALVE SHAFT OF A CONTROL DEVICE FOR RECIRCULATING EXHAUST GAS IN INTERNAL COMBUSTION ENGINES

CROSS REFERENCE TO RELATED APPLICATION

The present application is a national-stage entry under 35 U.S.C. §371 of International Application No. PCT/EP2011/071647 filed on Dec. 2, 2011, and claims the benefit of foreign priority under 35 U.S.C. §119(a)-(d) of German Application No. 10 2011 005 341.7, filed on Mar. 10, 2011.

FIELD OF THE INVENTION

The invention concerns a needle sleeve according to the generic features of claim 1, which is especially advantageously suitable for pivotably mounting the throttle valve shaft of a control device for exhaust gas recirculation in internal combustion engines.

BACKGROUND OF THE INVENTION

Exhaust gas recirculation in internal combustion engines is currently part of many engine concepts in order to meet prescribed emission limits, most notably in Europe. It serves to reduce nitrogen oxides in the combustion of fuels in gasoline and diesel engines in that a portion of the exhaust gases is deliberately conducted back to the combustion chamber of the internal combustion engine. At the present time, a distinction is made between two methods of exhaust gas recirculation in internal combustion engines, namely between internal exhaust gas recirculation by overlaps in the valve opening times by means of camshaft regulation or variable valve drives on the one hand, and external exhaust gas recirculation by means of a return line between the exhaust and intake trains and a control device located in the return line to control the throughput rate on the other hand.

Such a control device for external exhaust gas recirculation in internal combustion engines is known from DE 10 2006 053,716 A1, for example, and consists essentially of a throttle valve housing with a gas channel and a throttle valve that controls the passage of gas through the gas channel and is connected to a throttle valve shaft that extends transversely through the gas channel and can be pivoted by a positioning device. The throttle valve shaft in this design is supported on both sides of the gas channel in two throttle valve bearings arranged in the throttle valve housing, such as are also previously known from DE 10 2006 053,716 A1. Throttle valve bearings of this type, implemented as needle sleeves, consist primarily of a thin-walled outer ring formed by non-cutting means and of a needle roller and cage assembly that is inserted in this outer ring and is composed of a plurality of bearing needles and a needle cage that carries the bearing needles at uniform spacings in the circumferential direction. In this design, the outer ring has a radially inward facing fixed rim at one of its axial sides that is formed thereon during its fabrication, and has at its other axial side an inward facing flanged rim that is formed thereon after insertion of the needle roller and cage assembly and by means of which the needle roller and cage assembly is retained in the outer ring. In addition, one or more seals are located on both sides between these rims and the needle roller and cage assembly, by means of which the throttle valve bearing is sealed to prevent exhaust gas condensates from flowing through.

In new generations of engines in the Euro 5/US 7 emissions classes, however, it has been shown under long-term operating conditions that with increasing quantities of so-called blow-by gases, the throttle valve bearings of such control devices are exposed to correspondingly increased quantities of exhaust gas condensates that penetrate through the housing bores for the throttle valve shaft to the throttle valve bearings. These exhaust gas condensates have an oily/watery to oily/acidic composition, so that the needle sleeves of the throttle valve bearings, which as a general rule are made of hardened ball and roller bearing steel with low alloying content and low carbon content, are initially subject to increased attack by external corrosion, which also propagates into their interior despite the multiple sealing of the throttle valve bearings. In this process, the condensate first forms a rust layer at the outer rims of the needle sleeves, which spreads to the interior of the needle sleeves via their manufacturing-induced cut edges and advances to the seals of the throttle valve bearings. As the corrosion progresses further, rust creep then takes place in the seals, resulting in damage and the failure of the throttle valve bearings in conjunction with functional failure of the throttle valve.

A first countermeasure, the avoidance of corrosion of the throttle valve bearings by a corrosion-reducing zinc-iron coating of the outer rings, for example using Corrotect®, has heretofore proven unsuitable, since the acid-bearing condensate of the exhaust gases dissolves the zinc-iron coating, and thus its sacrificial anodic action that provides the corrosion protection is lost. Although another countermeasure, proposed in WO 2009/103,378 A1, to produce the needle sleeves of both throttle valve bearings from a high-alloy, corrosion-resistant sheet steel by deep-drawing without further heat and/or surface treatment, has indeed achieved the sought-after success, this measure has proven uneconomical on the whole because of the increased production and tooling costs required by such a material.

Object of the Invention

Starting from the described disadvantages of the prior art solutions, therefore, the object of the invention is to design a needle sleeve, in particular for pivotably mounting the throttle valve shaft of a control device for recirculating exhaust gas in internal combustion engines, that ensures reliable corrosion protection against exhaust gas condensates and at the same time is distinguished by economical manufacturability.

DESCRIPTION OF THE INVENTION

According to the invention, this object is achieved in a needle sleeve in accordance with the preamble of claim 1 by the means that the outer ring of the needle sleeve is designed as a rimless, cylindrical sleeve and the seals of the needle sleeve are composed of two lip sealing rings with an S-shaped cross-sectional profile that are located at least partially outside the outer ring and are pressed onto its axial edges, which sealing rings are at the same time implemented as radially inward facing ribs of the needle sleeve that retain the needle roller and cage assembly in the outer ring, and by means of which sealing rings the needle sleeve can be sealed both statically to a housing enclosing it and dynamically to prevent exhaust gas condensates from flowing through.

Preferred embodiments and advantageous further developments of the needle sleeve designed according to the invention are described in the dependent claims.

Thus, according to claim 2 provision is made in the needle sleeve designed according to the invention for the outer ring of the needle sleeve to be implemented either as a closed cylindrical sleeve deep-drawn from a blank or as a slotted cylindrical sleeve rolled from a metal strip. In the case of the closed cylindrical sleeve, the starting material is a round blank stamped from a metal strip material that, in multiple deep-drawing steps, is first formed into a cup shape and then is given its final hollow cylindrical shape by first punching out the cup bottom and then trimming. In contrast, in the case of the slotted cylindrical sleeve the starting material is a flat strip that is cut to length from a metal strip material, at whose ends a diagonal or herringbone joint is formed that is favorable for the bearing needles to roll over in a uniform manner, and that is then given its final cylindrical shape by rolling or circular bending. Both cited production methods belong to the category of non-cutting manufacturing processes, which are known to be distinguished by high efficiency. Because the needle sleeve designed according to the invention with a rimless outer ring also makes it possible to eliminate the production step of flanging and the preceding annealing, extremely economical production of the needle sleeve is thus made possible on the whole.

According to claim 3, another feature of the needle sleeve designed according to the invention is that the axial edges of the outer ring have a material thickness that is reduced as compared to the material thickness of the rest of the outer ring and are angled radially outward relative to the transverse axis of the bearing. In a concrete embodiment, this means that the axial edges of the outer ring are profiled such that they form end webs that are set back in a stepped manner from the outer circumferential surface of the outer ring and are radially angled from the inner circumferential surface of the outer ring, upon which end webs the S-shaped profile seals of the needle sleeve can be placed such that the outer circumferential surfaces of the seals and the outer circumferential surface of the needle sleeve are located approximately in a plane. The axial edges of the outer ring designed in such a way thus have the effect that the seals not only have sufficient construction space available for a minimum material thickness of their radially outward profile arm, but also do not hinder the installation of the needle sleeve in the throttle valve housing.

Nonetheless, for reliable static sealing of the needle sleeve to the throttle valve housing it has proven to be advantageous, as proposed in claim 4, for each of the seals to have a slightly larger diameter at their outer circumferential surfaces than the outer diameter of the outer ring. Since the seals are advantageously made of an elastomer, this enlarged outer diameter is compressed to the diameter of the bore upon insertion of the needle sleeve into the bore of the throttle valve shaft, and thus provides an increased static sealing force in the final position of the needle sleeve. Furthermore, according to claims 5 and 6, a further increase in the static sealing force of the seals can be achieved if each of the seals are additionally designed with either a circumferential grooving or multiple small beads on their outer circumferential surfaces, or with a circumferential, annular bead on their outer circumferential surfaces and an additional circumferential, annular bead on their inner surfaces facing the axial edges of the needle sleeve. The circumferential, annular bead on the inner surfaces facing the axial edges of the needle sleeve, in conjunction with the grooving and the annular bead on their outer circumferential surfaces, can achieve the result that the increased sealing force acts directly between these axial edges and the bore of the throttle valve shaft, and thus reliably prevents the entry of exhaust gas condensates into the needle sleeve.

Lastly, it is proposed through claim 7 as an advantageous embodiment of the needle sleeve designed according to the invention that the seals are each designed with at least one elastic sealing lip angled outward and acting radially inward for dynamic sealing to prevent exhaust gas condensates from flowing through at their inner circumferential surfaces. The outward-angled sealing lips of the two seals here accomplish the effect that they can adapt to the pressure of the inflowing exhaust gas condensates, and can also act with higher sealing force on the throttle valve shaft in the presence of increased pressure. At the same time, the inner sides of these sealing lips form the radially inward facing rims of the needle sleeve that retain the needle roller and cage assembly in the outer ring, wherein the danger of increased wear on the seals arising from friction between the needle roller and cage assembly and the seals can be dealt with through a metallic reinforcement in the seals, which is not enclosed in molded elastomer at the points of contact with the needle roller and cage assembly, and at the same time serves to stiffen the seals.

To summarize, the needle sleeve designed according to the invention thus has the advantage over needle sleeves according to the prior art that it can be produced significantly more economically as a result of the rimless design and simplified non-cutting manufacture of the outer ring. At the same time, the needle sleeve designed according to the invention exhibits significantly improved protection against corrosion from exhaust gas condensates due to the seals with S-shaped profile that are located outside the outer ring, since these seals enclose the cut edges of the outer ring and thus no longer expose any surfaces to attack by the exhaust gas condensate for rust formation. In addition, the seals simultaneously form the radially inward facing rims of the needle sleeve that retain the needle roller and cage assembly in the outer ring, and in the slotted embodiment of the outer ring also serve at the same time as a band to hold the ends of the outer ring together.

BRIEF DESCRIPTION OF THE DRAWINGS

The needle sleeve designed according to the invention is explained in detail below in two preferred embodiments with reference to the attached drawings. Shown are.

DETAILED DESCRIPTION OF THE DRAWINGS

Figure 1:
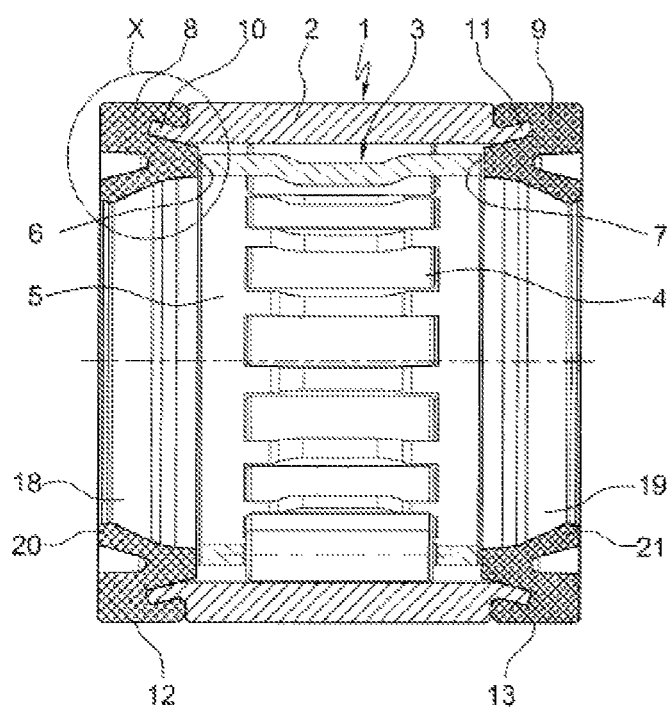
FIG. 1 a cross-section through a first embodiment of the needle sleeve designed according to the invention.
Figure 2:
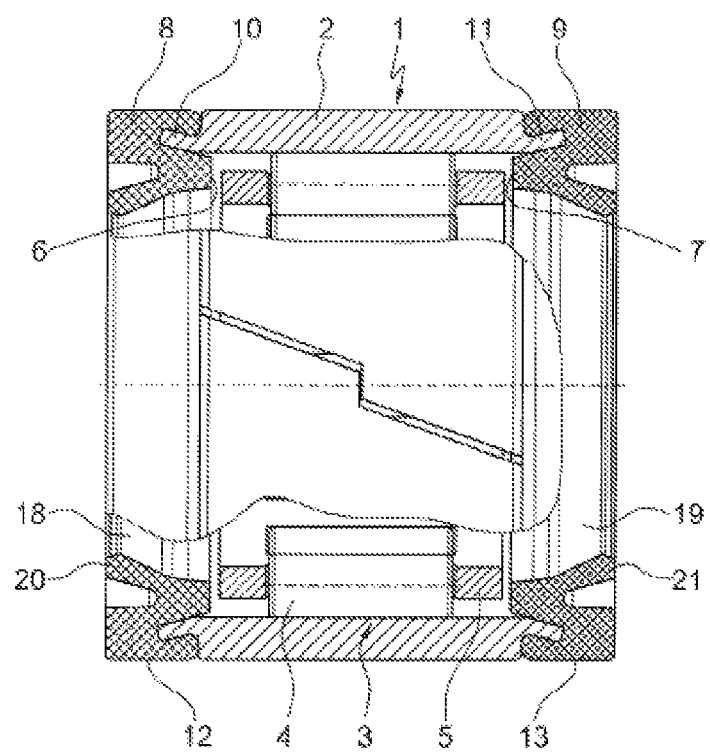
FIG. 2 a cross-section through a second embodiment of the needle sleeve designed according to the invention.

Evident from FIGS. 1 and 2 is a needle sleeve 1 suitable for pivotably mounting the throttle valve shaft of a control device for recirculating exhaust gas in internal combustion engines, which consists primarily of a thin-walled outer ring 2 formed by non-cutting means and of a needle roller and cage assembly 3 that is inserted in this outer ring 2 and is composed of a plurality of bearing needles 4 and a needle cage 5 that carries the bearing needles 4 at uniform spacings in the circumferential direction.

Moreover, it is clearly evident from FIGS. 1 and 2 that the outer ring 2 of the needle sleeve 1 is designed according to the invention as a rimless, cylindrical sleeve, and that each needle sleeve 1 is designed with two seals 8, 9, which according to the invention are composed of lip sealing rings with an S-shaped cross-sectional profile that are located at least partially outside the outer ring 2 and are pressed onto its axial edges 10, 11. Furthermore, the seals 8, 9 are at the same time designed as radially inward facing ribs 6, 7 of the needle sleeve 1 that retain the needle roller and cage assembly 3 in the outer ring 2, by means of which the needle sleeve 1 can be sealed both statically to a housing enclosing it and dynamically to prevent exhaust gas condensates from flowing through.

It can likewise be seen in FIG. 1 that in a first preferred embodiment the outer ring 2 of the needle sleeve 1 is implemented as a closed cylindrical sleeve deep-drawn from a blank, where the starting material is a round blank stamped from a metal strip material that, in multiple deep-drawing steps, is first formed into a cup shape and then is given its final hollow cylindrical shape by first punching out the cup bottom and then trimming.

In contrast, in the second preferred embodiment shown in FIG. 2 the outer ring 2 of the needle sleeve 1 is implemented as a slotted cylindrical sleeve rolled from a metal strip, where the starting material is a flat strip that is cut to length from a metal strip material, at whose ends is formed a herringbone joint of the type indicated in the drawing that is favorable for the bearing needles to roll over in a uniform manner, and that is then given its final hollow, cylindrical shape by circular bending.

Furthermore, it is also evident from FIGS. 1 and 2 that the axial edges 10, 11 of the outer ring 2 have a material thickness that is reduced as compared to the material thickness of the rest of the outer ring 2, and are angled radially outward relative to the transverse axis of the bearing, which is not shown. This means that the axial edges 10, 11 of the outer ring 2 are profiled such that they form end webs that are set back in a stepped manner from the outer circumferential surface of the outer ring 2 and are radially angled from the inner circumferential surface of the outer ring 2, upon which end webs the S-shaped profile seals 8, 9 of the needle sleeve 1 can be placed such that the outer circumferential surfaces 12, 13 of the seals 8, 9 and the outer circumferential surface of the outer ring 2 are located approximately in a plane.

Nonetheless, for reliable static sealing of the needle sleeve 1 to a housing that is not shown, it has proven to be advantageous, as is merely suggested in FIGS. 1 and 2, for each of the seals 8, 9 to have a slightly larger diameter at their outer circumferential surfaces than the outer diameter of the outer ring 2. However, an increase in the static sealing force of the seals 8, 9 can be achieved if the seals are additionally designed either with a circumferential grooving 14, 15 on their outer circumferential surfaces 12, 13, as is shown in FIG. 3, or, as is shown in FIG. 4, with a circumferential, annular bead 16, 17 on their outer circumferential surfaces 12, 13, and in each case with an additional circumferential, annular bead 20, 21 (visible in both FIGS. 3 and 4) on their inner surfaces 18, 19 facing the axial edges 10, 11 of the needle sleeve 1.

Figure 3:
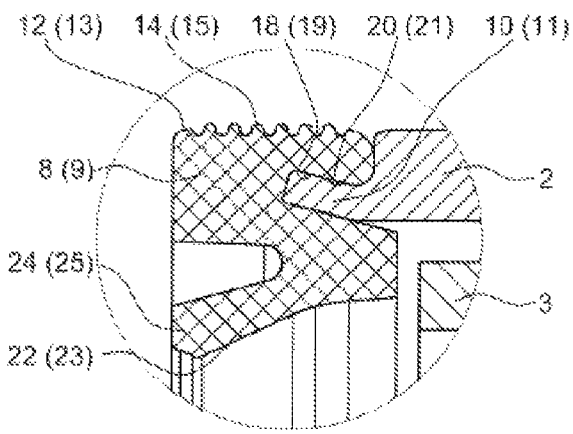
FIG. 3 an enlarged view of the detail X from FIG. 1, with a first variant of a seal design.
Figure 4:
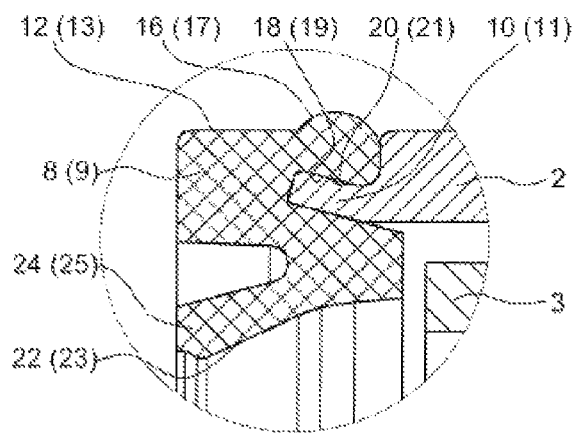
FIG. 4 an enlarged view of the detail X from FIG. 1, with a second variant of a seal design.

Lastly, it is also evident from FIGS. 1 and 2 and from the enlarged representations in FIGS. 3 and 4 that the seals 8, 9 are each designed with at least one elastic sealing lip 24, 25 angled outward and acting radially inward for dynamic sealing to prevent exhaust gas condensates from flowing through at their inner circumferential surfaces 22, 23, the outward angling of which sealing lips accomplishes the effect that they can adapt to the pressure of the inflowing exhaust gas condensates and can also act with higher sealing force on the throttle valve shaft in the presence of increased pressure.

LIST OF REFERENCE NUMERALS

1 needle sleeve
2 outer ring
3 needle roller and cage assembly
4 bearing needles
5 needle cage
6 rim
7 rim
8 seal
9 seal
10 axial edge
11 axial edge
12 outer circumferential surface of 8
13 outer circumferential surface of 9
14 grooving on 12
15 grooving on 13
16 annular bead on 12
17 annular bead on 13
18 inner surface of 8
19 inner surface of 9
20 annular bead on 18
21 annular bead on 19
22 inner circumferential surface of 8
23 inner circumferential surface of 9
24 sealing lip on 22
25 sealing lip on 23

The invention claimed is:

1. Needle sleeve for pivotably mounting the throttle valve shaft of a control device for recirculating exhaust gas in internal combustion engines, comprising:
 a thin-walled outer ring formed without cutting; and
 a needle roller and cage assembly inserted in said outer ring, said needle roller and cage assembly comprises a needle cage carrying a plurality of bearing needles at uniform spacings in a circumferential direction, the needle sleeve having at its axial sides two radially inward facing ribs holding the needle roller and cage assembly in the outer ring, said needle sleeve providing multiple seals that prevent exhaust gas condensates from flowing through, wherein
 the outer ring is a rimless, cylindrical sleeve, and
 the seals comprise two lip sealing rings having an S-shaped cross-sectional profile that are located at least partially outside the outer ring and are pressed onto its axial edges, the sealing rings also providing said radially inward facing ribs, whereby the needle sleeve can be sealed statically to a housing enclosing it.

2. The needle sleeve according to claim 1, wherein the outer ring is a closed cylindrical sleeve deep-drawn from a blank.

3. The needle sleeve according to claim 1, wherein the axial edges of the outer ring have a material thickness that is reduced as compared to the material thickness of the rest of the outer ring, and are angled radially outward relative to a transverse axis of the bearing.

4. The needle sleeve according to claim 3, wherein the seals each have a slightly larger diameter at their outer circumferential surfaces than the outer diameter of the outer ring.

5. The needle sleeve according to claim 4, wherein the seals further comprise a circumferential grooving at their outer circumferential surfaces.

6. The needle sleeve according to claim 4, wherein the seals further comprise an additional circumferential annular bead on their inner surfaces facing the axial edges of the needle sleeve.

7. The needle sleeve according to claim 4, wherein the seals further comprise a circumferential annular bead at their outer circumferential surfaces.

8. The needle sleeve according to claim 3, wherein the seals comprise at least one elastic sealing lip at their inner circumferential surfaces angled outward and acting radially inward.

9. The needle sleeve according to claim 1, wherein the outer ring is a slotted cylindrical ring rolled from a metal strip.

\* \* \* \* \*